United States Patent
Takai

(10) Patent No.: US 10,744,731 B2
(45) Date of Patent: Aug. 18, 2020

(54) BELT DRUM DEVICE

(71) Applicant: SUMITOMO RUBBER INDUSTRIES, LTD., Kobe-shi, Hyogo (JP)

(72) Inventor: Yuichi Takai, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 213 days.

(21) Appl. No.: 15/907,428

(22) Filed: Feb. 28, 2018

(65) Prior Publication Data

US 2018/0272642 A1    Sep. 27, 2018

(30) Foreign Application Priority Data

Mar. 22, 2017 (JP) ................... 2017-055694

(51) Int. Cl.
*B29D 30/24* (2006.01)
(52) U.S. Cl.
CPC .................. *B29D 30/242* (2013.01)
(58) Field of Classification Search
CPC .......... B29D 30/242; B29D 2030/2657; B29D 30/245; B29D 30/36; B29D 2030/2642
USPC ......................... 156/420, 417, 415
See application file for complete search history.

(56) References Cited

U.S. PATENT DOCUMENTS

| | | | | |
|---|---|---|---|---|
| 3,184,361 A | * | 5/1965 | Allitt | B29D 30/245 156/415 |
| 3,485,692 A | * | 12/1969 | Frazier | B29D 30/245 156/123 |
| 3,607,558 A | * | 9/1971 | Nebout | B29D 30/245 156/415 |
| 3,718,520 A | * | 2/1973 | Leblond | B29D 30/245 156/400 |
| 4,220,494 A | * | 9/1980 | Kawaida | B29D 30/248 156/415 |
| 8,899,292 B2 | * | 12/2014 | Jones | B29D 30/242 156/417 |
| 2014/0338818 A1 | | 11/2014 | Otani | |

FOREIGN PATENT DOCUMENTS

| | | | | |
|---|---|---|---|---|
| FR | 1510912 A | * | 1/1968 | ............. B29D 30/36 |
| GB | 1287805 A | * | 9/1972 | ........... B29D 30/245 |
| JP | 2014-226813 A | | 12/2014 | |
| SU | 616151 A1 | * | 7/1978 | |

* cited by examiner

*Primary Examiner* — Michael H. Wilson
*Assistant Examiner* — Alexander D Booth
(74) *Attorney, Agent, or Firm* — Birch, Stewart, Kolasch & Birch, LLP

(57) ABSTRACT

A belt drum device 1 for forming a belt 37 includes a drum base 2 rotatable around a drum rotational axis (2c) and belt support portions 3 arranged outside the drum base 2 and capable of extending and contracting. Each belt support portion 3 includes a first link plate 5 and a second link plate 6 both rotatable and each having an outer peripheral surface 11 around which the belt 37 is wound. The outer peripheral surface 11 in a contracted state includes a flat surface portion 16 extending straight in a drum axial direction on an outer-end side and an arc-shaped curved surface portion 17 curved toward the drum rotational axis (2c). The curved surface portions 17 of both link plates 5 and 6 in an expanded state are substantially continuous to form a continuous arc region 24 convex outwardly in a drum radial direction.

9 Claims, 10 Drawing Sheets

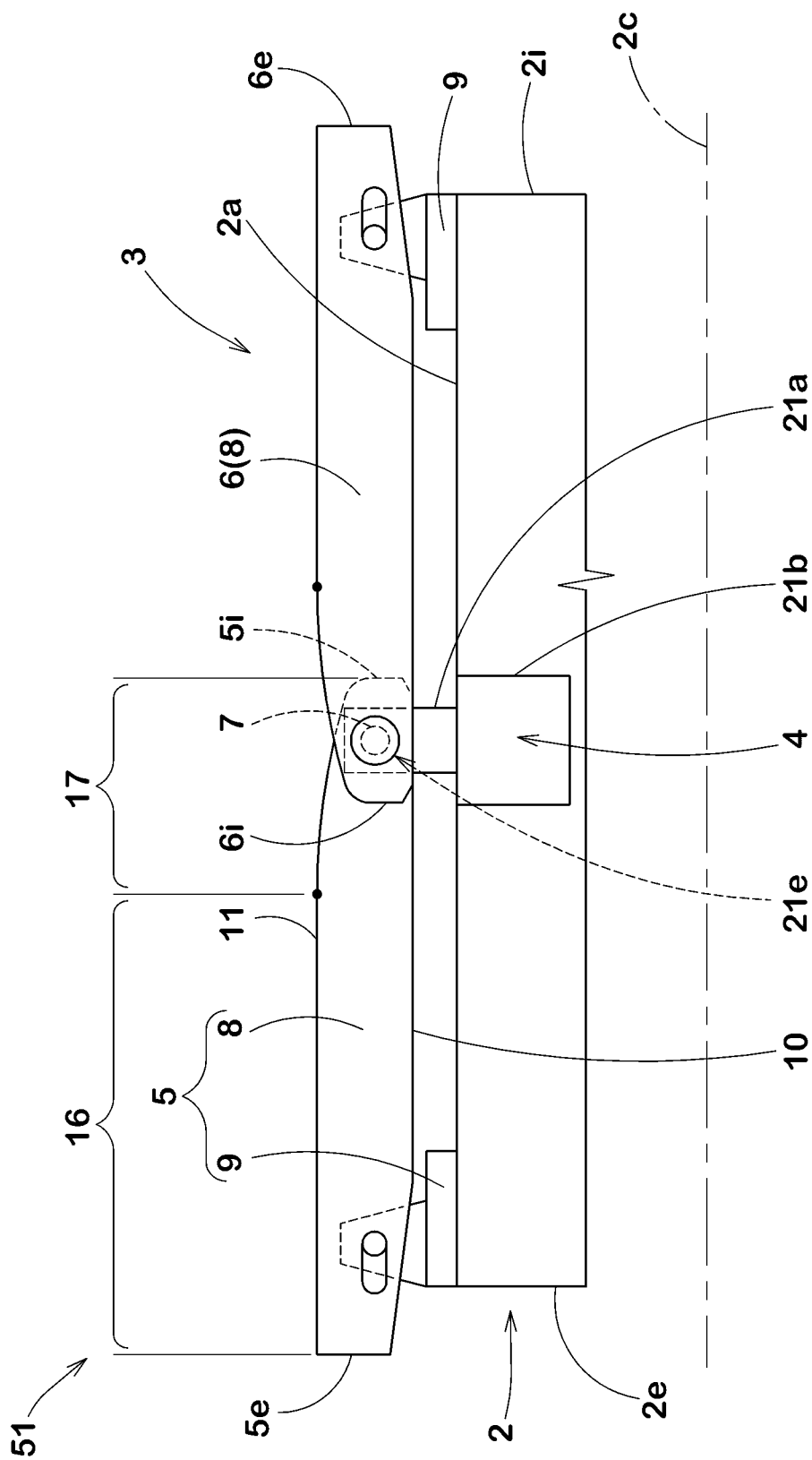

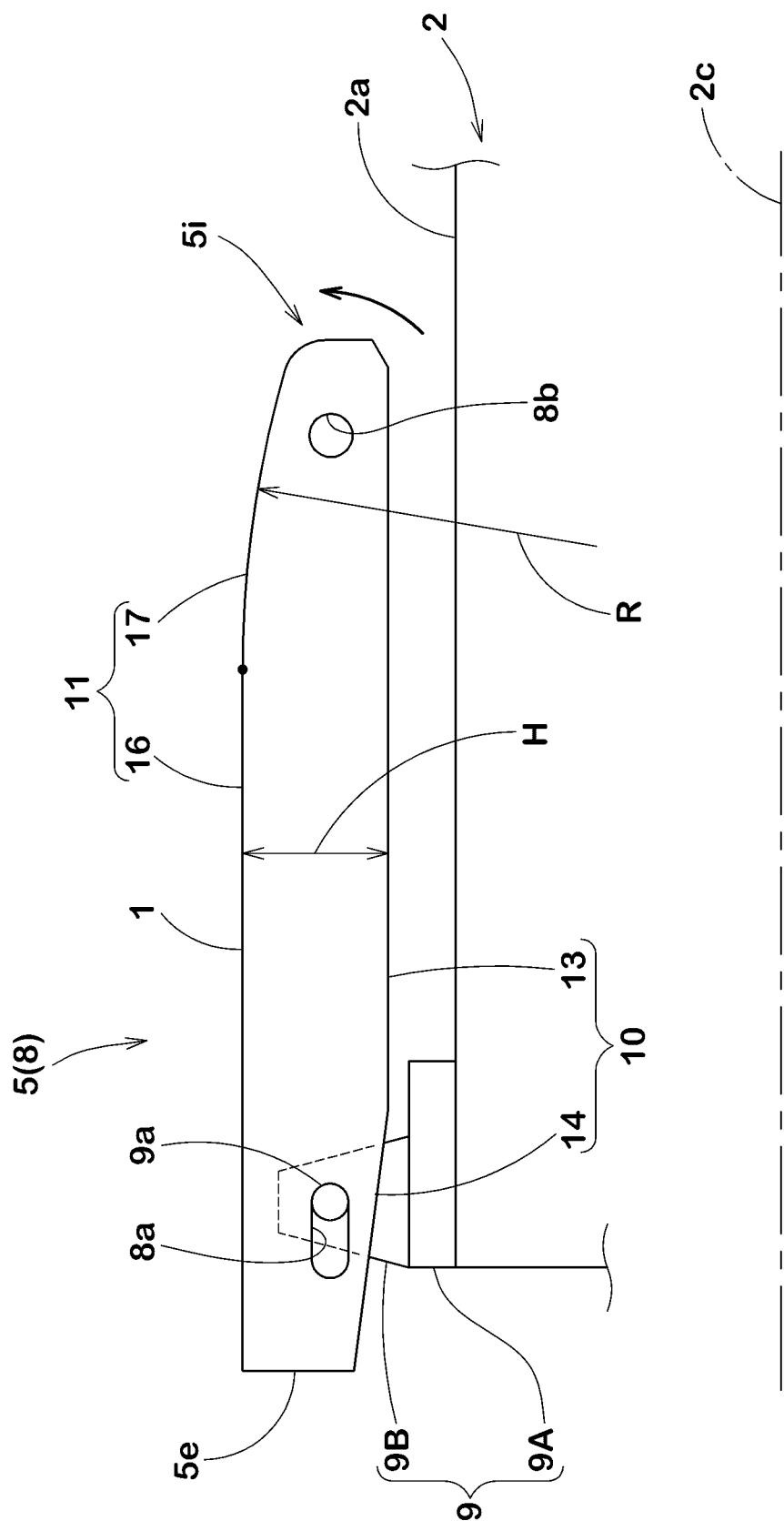

BELT DRUM DEVICE

TECHNICAL FIELD

The present invention relates to a belt drum device used for manufacturing a pneumatic tire capable of having improved high-speed durability performance.

BACKGROUND ART

Conventionally, in a process of forming a green tire (tire before vulcanization) for a pneumatic tire, the following method has been known. Specifically, as shown in FIG. 8A, belt plies (b1), a tread rubber (b2), and the like are laminated on a belt drum device (a) to fora a cylindrical belt structure (b) in advance. The belt ply (b1) is formed by winding a sheet-like belt ply in a circumferential direction, for example. The tread rubber (b2) is formed by winding a sheet-like tread rubber material in the circumferential direction, for example.

Further, at this time, a green tire main body (f) is formed by being inflated to have a toroidal shape on a shaping drum (c) positioned adjacently to the belt drum device (a), for example. In the method of forming the green tire main body (f), first, a sheet-like carcass ply (d) is wound in a cylindrical shape on a carcass forming drum (not shown), second, bead cores (e) are attached to both edges of the wound carcass ply to form a carcass base body, then a cylindrical green tire main body (f1) including the carcass base body is formed. Next, by using the shaping drum (c), the green tire main body (f1) is inflated to form the toroidal green tire main body (f). Next, as shown in FIG. 8B, the belt structure (b) is moved onto the green tire main body (f) and bonded together. Next, by using a stitch roller (g), for example, both edges of the belt structure (b) are pressed against the green tire main body (f) so that the entire belt structure (b) is bonded to the green tire main body (f). This process of pressing by the stitch roller (g) may be sometimes referred to as a stitch process.

However, in this stitch process, an outer diameter of the belt structure (b) is remarkably decreased at both edges thereof, resulting in a so-called minus stretch, which leads to undulating deformation, therefore, meandering and arrangement disorder occur in belt cords (not shown) of the belt plies (b1). In particular, if a band ply (not shown) is included in the belt structure (b), since the band cords are continuous in the circumferential direction, meandering becomes large. As described above, it is possible that tires manufactured by the conventional manufacturing method cannot exert high high-speed durability performance for the reasons described above. In order to solve such a problem, for the purpose of suppressing the undulating deformation in the stitch process, it is required that the belt plies (b1) of the belt structure (b) have a shape close to a profile of the belt of the tire after vulcanization in advance of the stitch process.

Japanese Unexamined Patent Application Publication No. 2014-226813 has disclosed a belt drum device for solving the above problem. For example, as shown in FIG. 9A, a belt drum device (h) has an outer peripheral surface (h1) around which the belt structure (b) including the belt plies (b1) is wound, and includes a drum base (i), belt support portions (j), and expansion and contraction means (k). The drum base (i) is formed so as to be rotatable around a drum rotational axis (i1) A plurality (not shown) of the belt support portions (j) is arranged outside the drum base (i) around the drum rotational axis (i1) in a drum circumferential direction. Each of the belt support portions (j) has a central portion (j1) which forms the outer peripheral surface (h1) and extends in a drum axial direction and a pair of side portions (j2) which also form the outer peripheral surface (h1) and are provided on both sides of the central portion (j1). The central portion (j1) is hinge-coupled with each of the side portions (j2) and each of the side portions (j2) is hinge-coupled with the drum base (i). Each of the expansion and contraction means (k) is connected to the central portion (j1) and has a structure to move the central portion (j1) inwardly and outwardly in a drum radial direction. Thereby, each of the expansion and contraction means (k) can expand and contract the outer peripheral surface (h1).

In the belt drum device (h) configured as described above, the outer peripheral surface (h1) can be secured in parallel with the drum rotational axis (i1) of the drum base (i) in a contracted state. Further, as shown in FIG. 9B, in a expanded state, the outer peripheral surface (h1) is deformed so as to protrude outwardly in the drum radial direction. Thereby, in the contracted state, the belt structure (b), especially the sheet-like belt plies (b1) can be wound accurately. Further, by changing from the contracted state to the expanded state, it is possible to make the belt plies (b1) into a toroidal shape convex outwardly in the drum radial direction, therefore, it is possible that the undulating deformation in the stitch process is suppressed.

However, each of the central portion (j1) and the side portions (j2) of the belt drum device (h) is formed in a substantially rectangular shape in a transverse cross-sectional view thereof, thus, in the expanded state, the outer peripheral surface (h1) is formed by a combination of three straight lines, therefore, angular protruding portions (n) are formed at connecting portions between the central portion (j1) and the side portions (j2), thereby, it is difficult to form the belt plies (b1) in a smooth circular arc shape.

SUMMARY OF THE INVENTION

The present invention was made in view of the above, and a primary object thereof is to provide a belt drum device used for manufacturing a pneumatic tire having excellent high-speed durability performance by improving the outer peripheral surface of the belt drum device.

In one aspect of the present invention, a belt drum device for forming a belt structure including a belt to be used in a tread of a tire comprises a drum base rotatable around a drum rotational axis, a plurality of belt support portions arranged outside the drum base around the drum rotational axis in a drum circumferential direction, and a plurality of expansion and contraction means each for expanding and contracting corresponding one of the belt support portions in a drum radial direction, wherein each of the plurality of the belt support portions comprises a first link plate of which outer end is rotatably connected with a first end of the drum base, a second link plate of which outer end is rotatably connected with a second end of the drum base, and a pin connecting inner ends of the first link plate and the second link plate so as to be movable in the expanding and contracting direction, each of the first link plate and the second link plate has an outer peripheral surface around which the belt is wound in the drum circumferential direction, in a transverse cross-sectional view passing through the drum rotational axis of the first link plate and the second link plate in a contracted state, each of the outer peripheral surfaces comprises a flat surface portion extending straight on a side of the outer end in a drum axial direction and an arc-shaped curved surface portion connected with the flat surface portion and curved toward the drum rotational axis as it approaches the inner end, and in a transverse cross-sectional view passing through the drum rotational axis of the first link plate and the second link plate in a expanded state, the curved surface portion of the first link plate and the curved surface portion of the second link plate are substantially continuous so as to form a continuous arc region convex outwardly in the drum radial direction.

In another aspect of the invention, it is preferred that the continuous arc region in the expanded state has a width in a range of from 30% to 85% of a width of the outer peripheral surface.

In another aspect of the invention, it is preferred that a radius of curvature of the curved surface portion is in a range of from 260 to 1200 mm.

In another aspect of the invention, it is preferred that in the contracted state, a maximum concave amount of the curved surface portion with respect to the flat surface portion is not more than 10 mm.

In another aspect of the invention, it is preferred that the outer ends of the first link plate and the second link plate are each provided with an elongated hole elongated in a longitudinal direction of the first link plate and the second link plate, the first link plate and the second link plate are connected with the drum base by the pin positioned inside the elongated holes so as to penetrate both of the elongated holes so that the first link plate and the second link plate can also slide with respect to the drum base, and the inner ends of the first link plate and the second link plate are connected with each other so as not to slide with respect to each other.

BRIEF DESCRIPTION OF THE DRAWINGS

FIG. 4A is a transverse cross-sectional view of a belt support portion.

FIG. 4B is an enlarged view of FIG. 4A.

DESCRIPTION OF THE PREFERRED EMBODIMENT

An embodiment of the present invention will now be described in conjunction with accompanying drawings.

Figure 1:
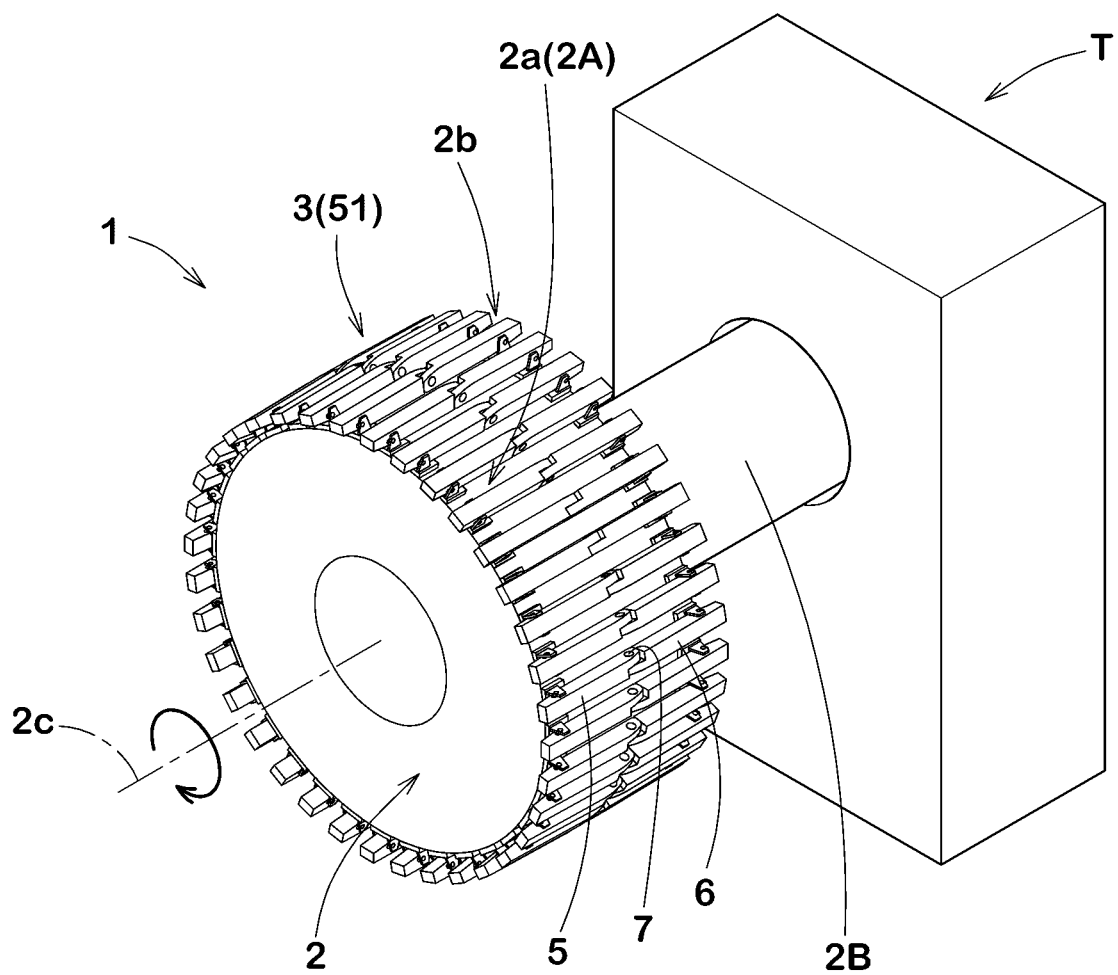
FIG. 1 is a perspective view showing an embodiment of a belt drum device of the present invention.

FIG. 1 is a perspective view of an entire belt drum device (hereinafter may be simply referred to as "device") 1 for manufacturing a belt structure 32 (shown in FIG. 2) used for a tread 31 of a tire 30 in this embodiment. The belt structure 32 manufactured by the device 1 of the present invention is used for various pneumatic tires such as pneumatic tires for passenger cars, for motorcycles, for heavy duty and the like.

Figure 2:
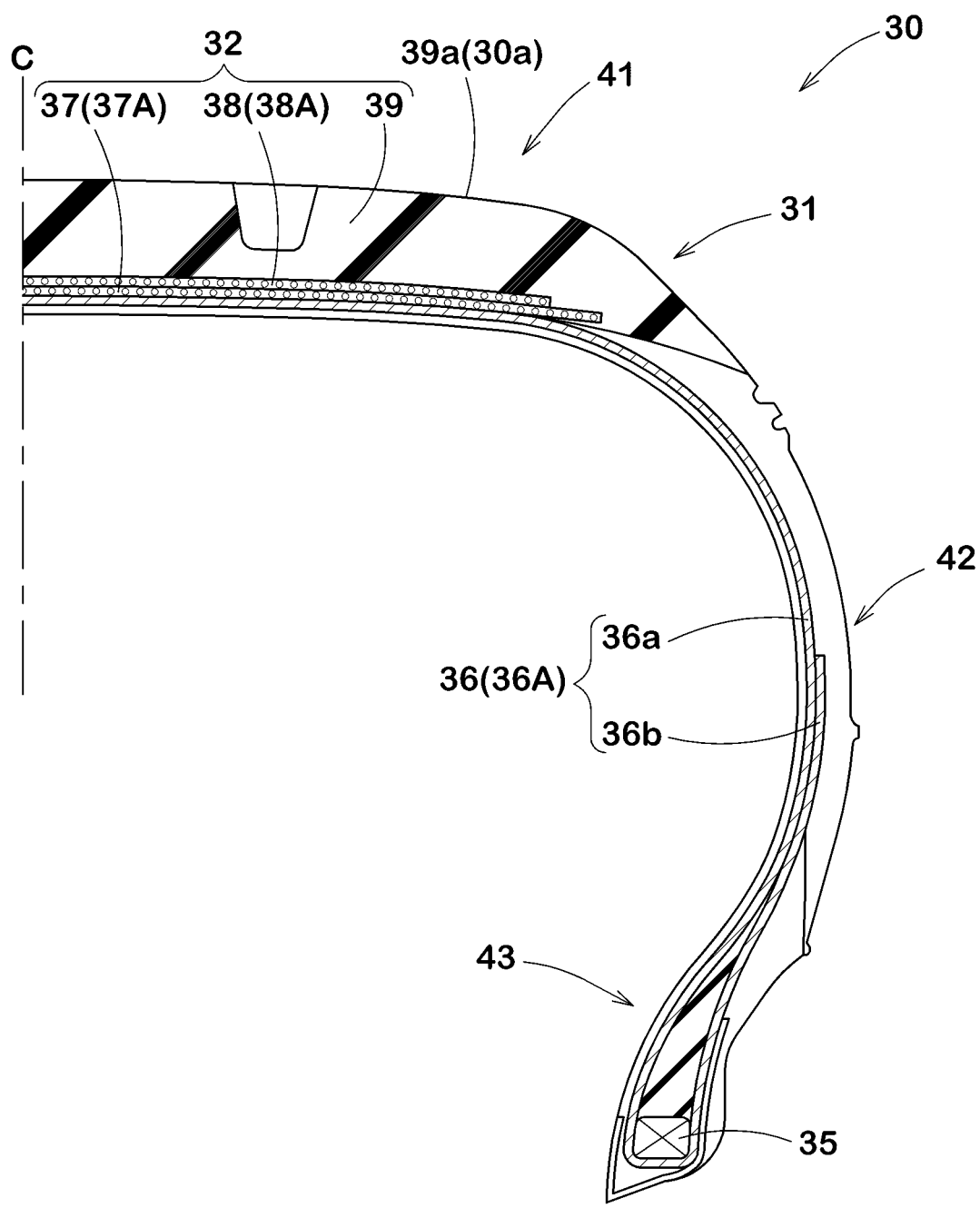
FIG. 2 is a cross-sectional view of right side of a tire manufactured by using the belt drum device of FIG. 1.

FIG. 2 is a cross-sectional view of right side of the tire 30 manufactured by using the device 1. The tire 30 is provided with a carcass 36, a belt 37, a band 38, and a tread rubber 39. The carcass 36 in this embodiment is formed of one carcass ply 36A. The carcass 36 is made of, for example, a main body portion (36a) extending between bead cores 35 of bead portions 43 via a tread portion 41 and sidewall portions 42, and a pair of turned up portions (36b) extending continuously from both ends of the main body portion (36a) and each turned up around respective one of the bead cores 35 from the inside to the outside. The belt 37 is arranged outside the carcass 36 in a tire radial direction and inside of the tread portion 41. The belt 37 in this embodiment is formed of one belt ply 37A in a tire radial direction. The band 38 is arranged outside the belt 37 in the tire radial direction and inside of the tread portion 41. The band 38 in this embodiment is formed of a band ply 38A in which band cords are wound spirally in a tire circumferential direction. The tread rubber 39 is arranged outside the band 38 in the tire radial direction, and an outer surface (39a) thereof forms a ground contacting surface (30a) of the tire 30.

The belt structure 32 is composed of the belt 37, the band 38, and the tread rubber 39, for example. The belt structure 32 formed by the device 1 is applied on a green tire main body (not shown), which includes the carcass 36, waiting on a downstream side in the process to form a green tire.

Figure 3:
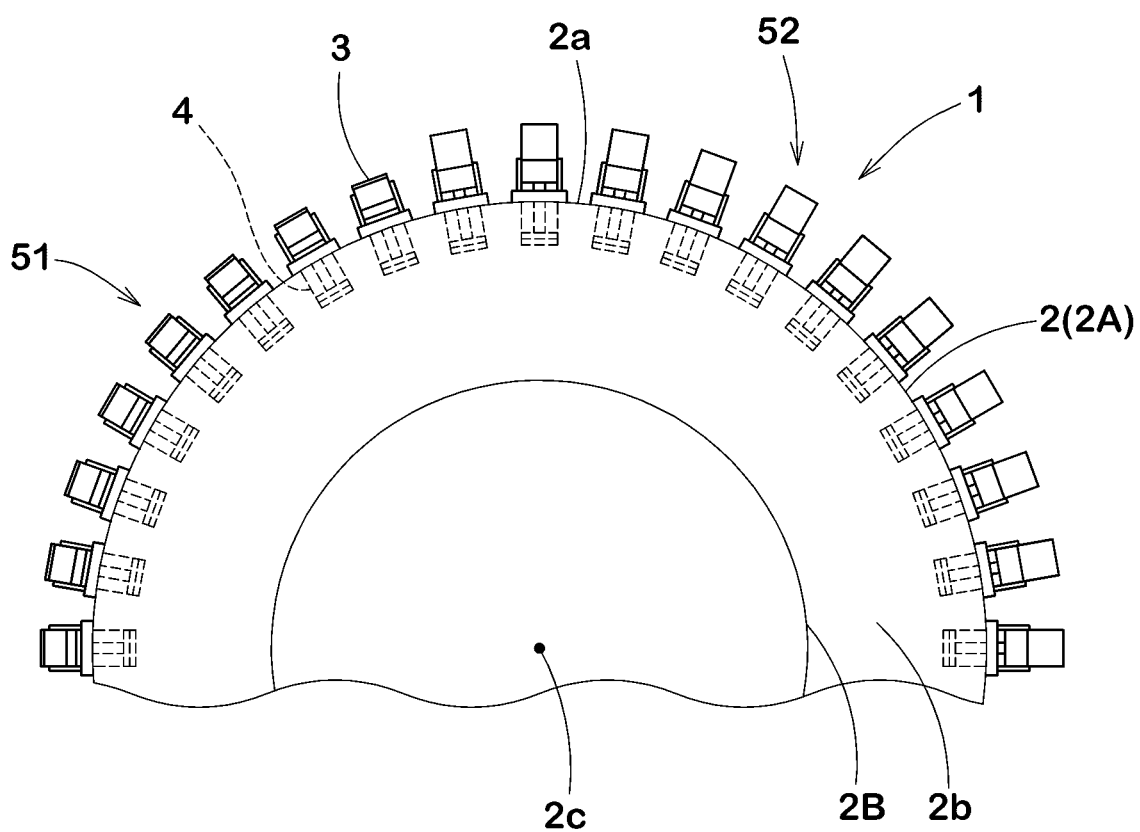
FIG. 3 is a side view of the belt drum device of FIG. 1.

FIG. 3 is a side view of the device 1. As shown in FIGS. 1 and 3, the device 1 in this embodiment includes a drum base 2 rotatable around a drum rotational axis (2c), belt support portions 3 arranged outside the drum base 2, and expansion and contraction means 4 for expanding and contracting the belt support portions 3 in a drum radial direction. FIG. 1 shows a state in which the belt support portions 3 are contracted (hereinafter may be simply referred to as "contracted state") 51. FIG. 3 shows the contracted state 51 of the belt support portions 3 and a state in which the belt support portions 3 are expanded (hereinafter may be simply referred to as "expanded state") 52. The drum rotational axis (2c) is held parallel to the horizontal direction, for example.

The drum base 2 in this embodiment is formed in a cylindrical shape and includes a drum main body 2A having an outer circumferential surface portion (2a) extending in a drum circumferential direction, and a drum rotational shaft portion 2B projecting outward from a side surface (2b) on one side of the drum main body 2A.

The drum rotational shaft portion 2B of the drum base 2 in this embodiment is supported in a cantilever manner by a drive unit (T) in which an electric motor (not shown) for rotating the drum rotational shaft portion 2B, a gear case (not shown), and the like are stored.

In this embodiment, a plurality, specifically in about a range from 30 to 50, of the belt support portions 3 is arranged on the outer circumferential surface portion (2a) of the drum base 2 around the drum rotational axis (2c) in the drum circumferential direction. Each of the belt support portions 3 in this embodiment includes a first link plate 5, a second link plate 6, and a pin 7.

FIG. 4A is a cross-sectional view passing through the drum rotational axis (2c) of the first link plate 5 and the second link plate 6 in the contracted state 51. As shown in FIG. 4A, the first link plate 5 in this embodiment has an outer end (5e) positioned on a side of a first end (2e) (left side in the figure) of the drum base 2 and an inner end (5i) positioned on a side of a center of the drum base 2. The second link plate 6 in this embodiment has an outer end (6e) positioned on a side of a second end (2i) (right side in the figure) of the drum base 2 and an inner end (6i) positioned on the center side of the drum base 2. Note that the outer end (5e) of the first link plate 5 may be provided on the side of the second end (2i) and the outer end (6e) of the second link plate 6 may be provided on the side of the first end (2e).

The first link plate 5 and the second link plate 6 in this embodiment are configured in the same manner. Thereby, the first link plate 5 will be described on behalf of both of them.

The first link plate 5 in this embodiment includes a link main body portion 8 formed in a substantially prismatic column shape and extending along a drum axial direction of the drum base 2, and a rotatably holding portion 9 for holding the link main body portion 8 in a rotatable manner.

The link main body portion 8 has an inner peripheral surface 10 that faces the drum base 2 and an outer peripheral surface 11 that is opposite to the inner peripheral surface 10 and around which the belt 37 is wound.

FIG. 4B is an enlarged view of the first link plate 5 of FIG. 4A. As shown in FIG. 4B, the inner peripheral surface 10 of the link main body portion 8 includes a first flat surface portion 13 extending straight on a side of the inner end (5i) and a first inclined portion 14 connected with the first flat surface portion 13 and inclined in a direction so that a height (H) of the first link plate 5 gradually decrease toward the outer end (5e). Note that the inner peripheral surface 10 is not limited to such a configuration, and may be configured as various forms.

The outer peripheral surface 11 of the link main body portion 8 in this embodiment has a second flat surface portion 16 extending straight in the drum axial direction on a side of the outer end (5e), and an arc-shaped first curved surface portion 17 connected with the second flat surface portion 16 and curved toward the drum rotational axis (2c) as it approaches the inner end (5i). The first curved surface portion 17 and the first flat surface portion 13 in this embodiment are connected with each other in a smooth circular arc shape.

The link main body portion 8 in this embodiment is provided with an elongated hole (8a) elongated in a longitudinal direction of the link main body portion 8 and arranged on the side of the outer end (5e), and a circular hole (8b) arranged on the side of the inner end (5i).

The rotatably holding portion 9 includes a base 9A fixed to the outer circumferential surface portion (2a) of the drum base 2, and a holding base portion 9B protruding outwardly in the drum radial direction from the base 9A and provided with a first pin (9a) to be positioned inside the elongated hole (8a) so as to penetrate the elongated hole (8a). The first pin (9a) of the rotatably holding portion 9 is positioned inside the elongated hole (8a) of the link main body portion 8 so as to penetrate the elongated hole (8a), thus, the link main body portion 8 is rotatably held by the first pin (9a), therefore, it is possible that the link main body portion 8 rotates around the first pin (9a) while sliding along the drum axial direction.

Figure 5:
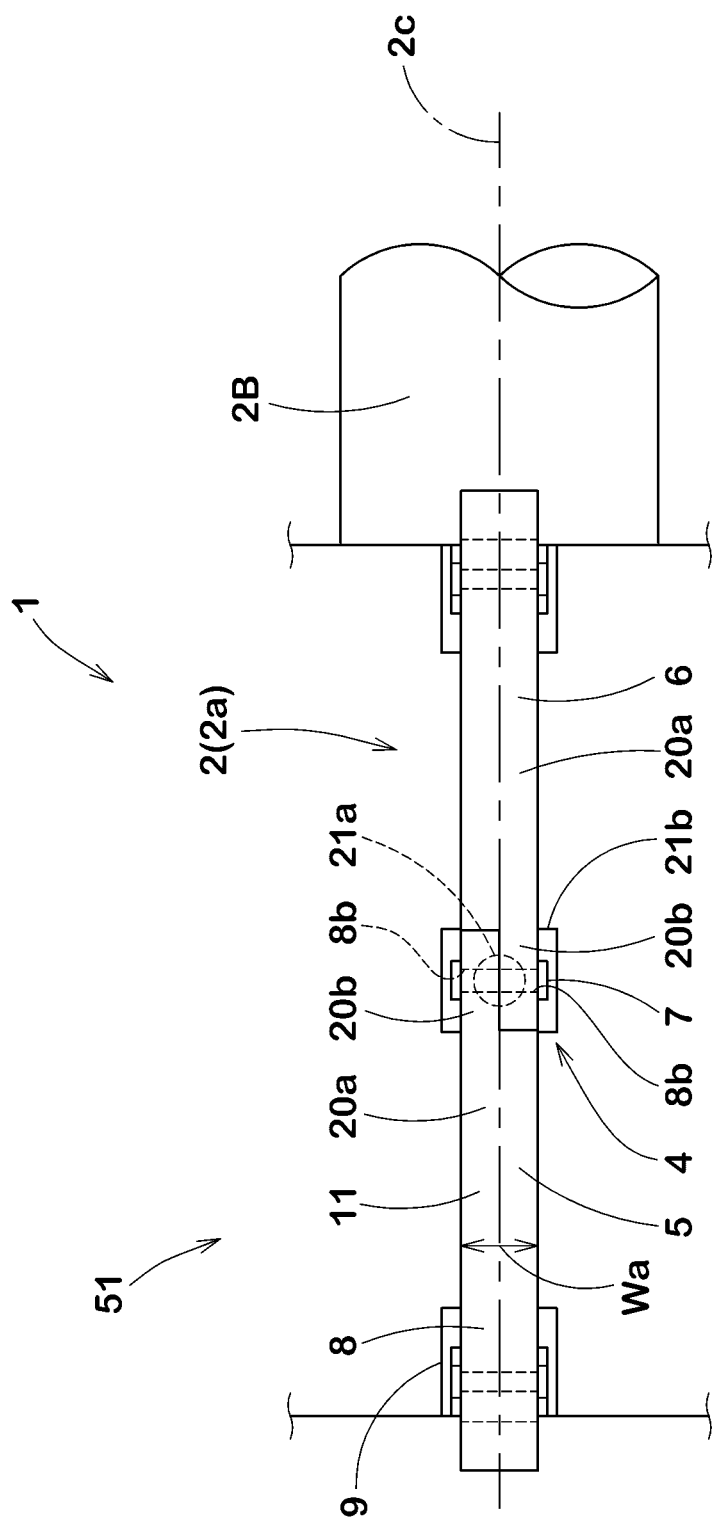
FIG. 5 is a plan view of the belt drum device.

FIG. 5 is a plan view of the device 1 in the contracted state 51. As shown in FIG. 5, in the first link plate 5 in this embodiment, the outer peripheral surface 11 comprises a wide portion (20a) having a constant width (wa) in the drum circumferential direction and a narrow portion (20b) connected with the wide portion (20a) and having a width smaller than that of the wide portion (20a). In this embodiment, the narrow portion (20b) of the first link plate 5 and the narrow portion (20b) of the second link plate 6 are arranged tea face each other so as to have a total width substantially the same as the width (wa) of the wide portion (20a). The narrow portion (20b) in this embodiment has the circular hole (8b). Note that the shape of the first link plate 5 in plan view is not limited to such a shape and may be configured as various forms.

The pin 7 in this embodiment is positioned inside the circular hole (8b) of the first link plate 5 and the circular hole (8b) of the second link plate 6 so as to penetrate both of the circular holes (8b), therefore, the first link plate 5 and the second link plate 6 can rotate around the pin 7 without sliding in the drum axial direction.

As shown in FIG. 4A, it is preferred that the expansion and contraction means 4 is formed by an actuator drivable by pneumatic or electric power such as a rod cylinder or the like including a piston rod (21a) and a cylinder (21b) for storing the piston rod (21a), for example. The piston rod (21a) in this embodiment extends in a direction protruding from the outer circumferential surface portion (2a) of the drum base 2, and an outer end (21e) thereof is connected with the first link plate 5 and the second link plate 6 via the pin 7. The cylinder (21b) in this embodiment is buried in the drum base 2. However, the expansion and contraction means 4 is not limited to such an embodiment.

In the device 1 configured as such, the expansion and contraction of the piston rod (21a) of the expansion and contraction means 4 moves the inner end (5i) of first link plate 5 and the inner end (6i) of the second link plate 6 inwardly and outwardly in the drum radial direction while making the outer end (5e) of the first link plate 5 and the outer end (6e) of the second link plate 6 slide in the drum axial direction. Thereby, the outer peripheral surfaces 11 of the first link plates 5 and the second link plates 6 define the contracted state 51 and the expanded state 52.

Further, the first inclined portion 14 is inclined, therefore, contact of the first link plate 5 with the outer circumferential surface portion (2a) of the drum base 2 and with the base 9A when the first link plate 5 slides and rotates is suppressed.

Next, a method of manufacturing the belt structure 32 by using the device 1 in this embodiment will be described. The belt structure 32 in this embodiment is formed by sequentially arranging the belt ply 37A, the band ply 38A, and the tread rubber 39 from the inside to the outside in the tire radial direction in this order.

Figure 6A:
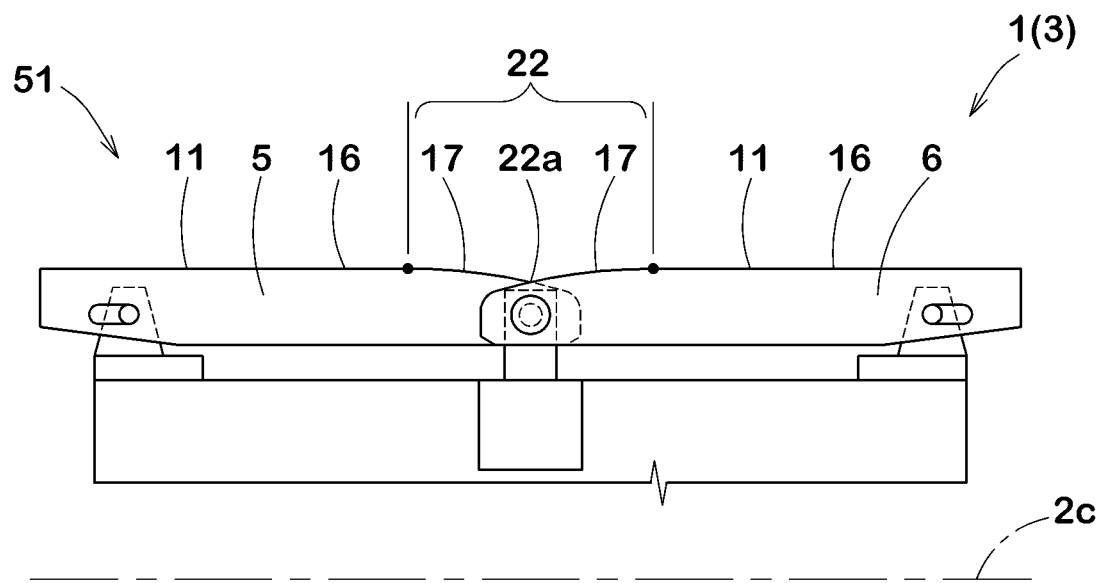
FIG. 6A is a transverse cross-sectional view illustrating a process of forming a belt structure according to the present embodiment.

As shown in FIG. 6A, firstly, the belt support portions 3 of the device 1 are held in the contracted state 51. At this time, in a transverse cross-sectional view, the second flat surface portion 16 of the first link plate 5 and the second flat surface portion 16 of the second link plate 6 in this embodiment are held in parallel to the drum rotational axis (2c) and heights in the drum radial directions of the two flat surface portions 16 are aligned. Further, in the transverse cross-sectional view, a part of the first curved surface portion 17 of the first link plate 5 and a part of the first curved surface portion 17 of the second link plate 6 are connected with each other to form a curved surface portion 22 comprising two arc-shaped portions sandwiching a concave portion (22a) concave toward the drum rotational axis (2c).

Figure 6B:
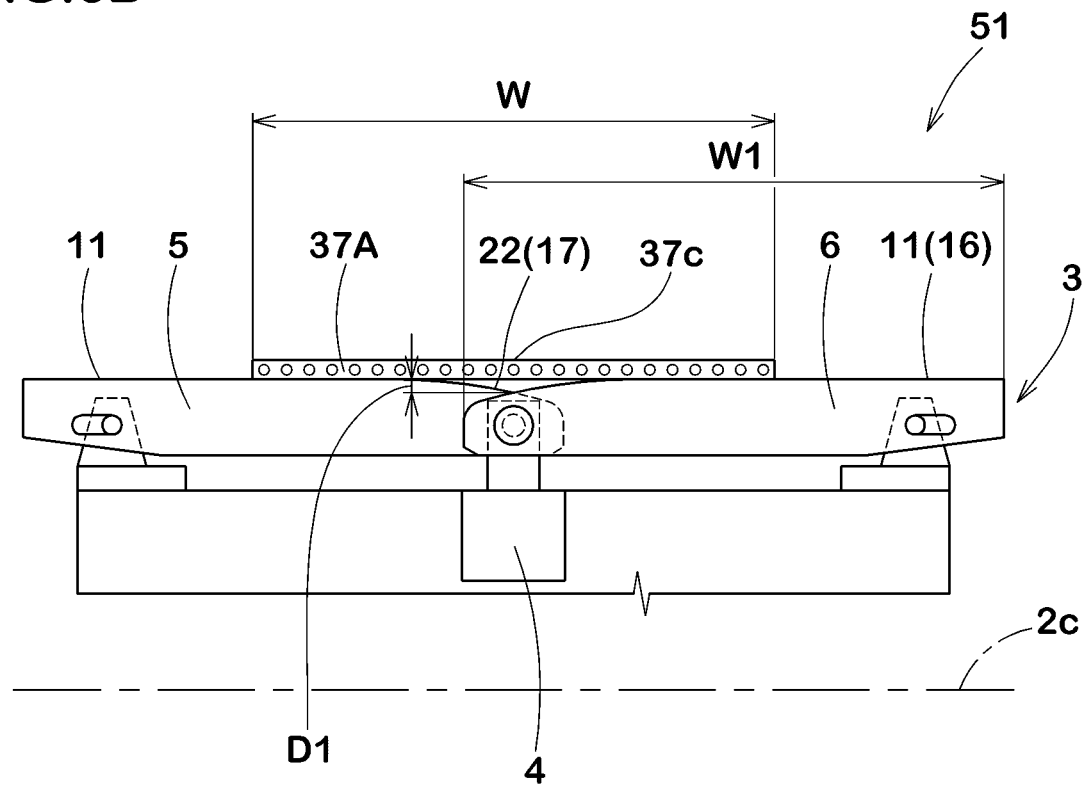
FIG. 6B is a transverse cross-sectional view illustrating a process of forming a belt structure according to the present embodiment.

Next, as shown in FIG. 6B, a sheet-like belt ply 37A is wound around the outer peripheral surfaces 11 of both of the first link plate 5 and the second link plate 6. At this time, by aligning a middle position (37c) of a width (w) of the belt ply 37A on the concave portion (22a), for example, the belt ply 37A is formed with high accuracy.

The curved surface portion 22 concave toward the drum rotational axis (2c) is formed in the outer peripheral surface 11 in this embodiment, therefore, it is preferred that both edges in the drum axial direction of the belt ply 37A are held by a vacuum absorption device or a magnet, for example. From this point of view, in the contracted state 51, it is preferred that a maximum concave amount D1 of the first curved surface portion 17 with respect to the second flat surface portion 16, that is, a distance in the drum radial direction of the curved surface portion 22 is not more than 10 mm. If the maximum concave amount D1 is more than 10 mm, the both edges of the belt ply 37A can not be held by the above-described vacuum absorption device or the like, therefore, it is possible that accurate formation can not be performed.

Figure 7A:
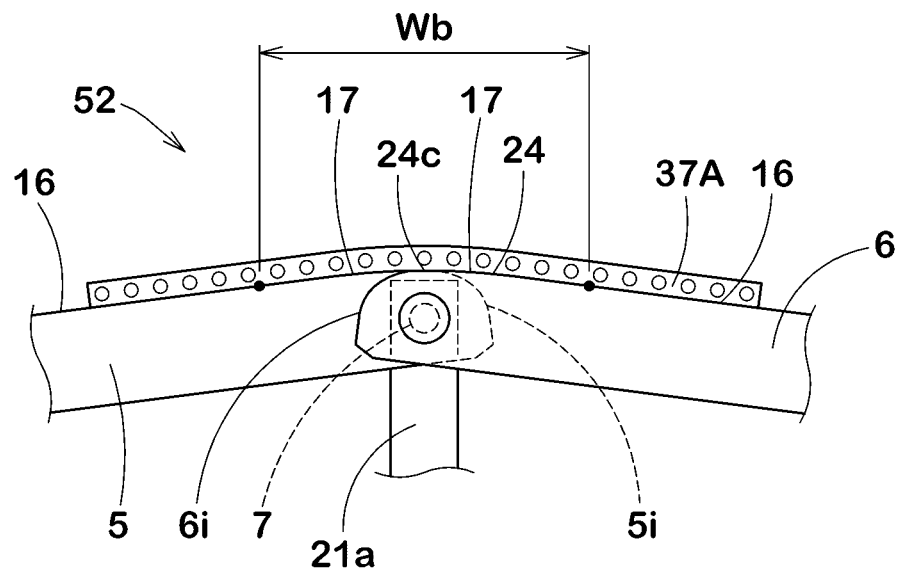
FIG. 7A is a transverse cross-sectional view illustrating a process of forming a belt structure according to the present embodiment.
Figure 7B:
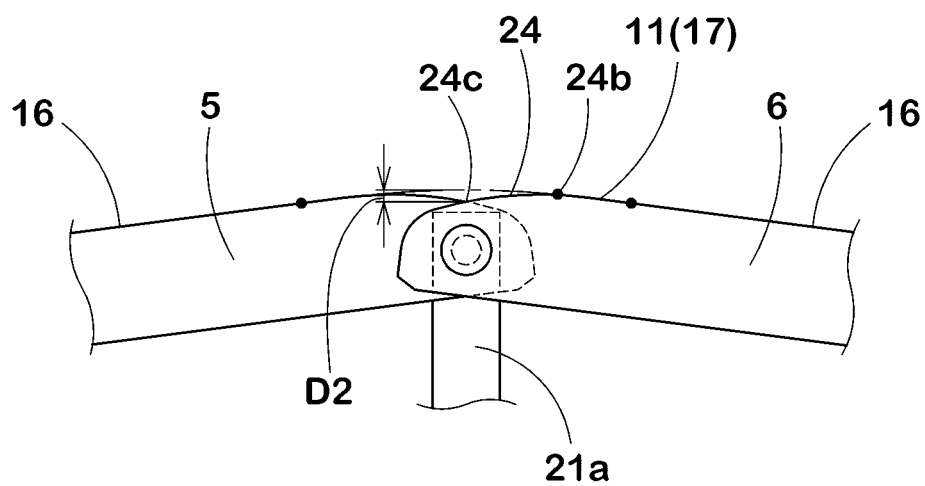
FIG. 7B is a transverse cross-sectional view illustrating a process of forming a belt structure according to the present embodiment.
Figure 8A:
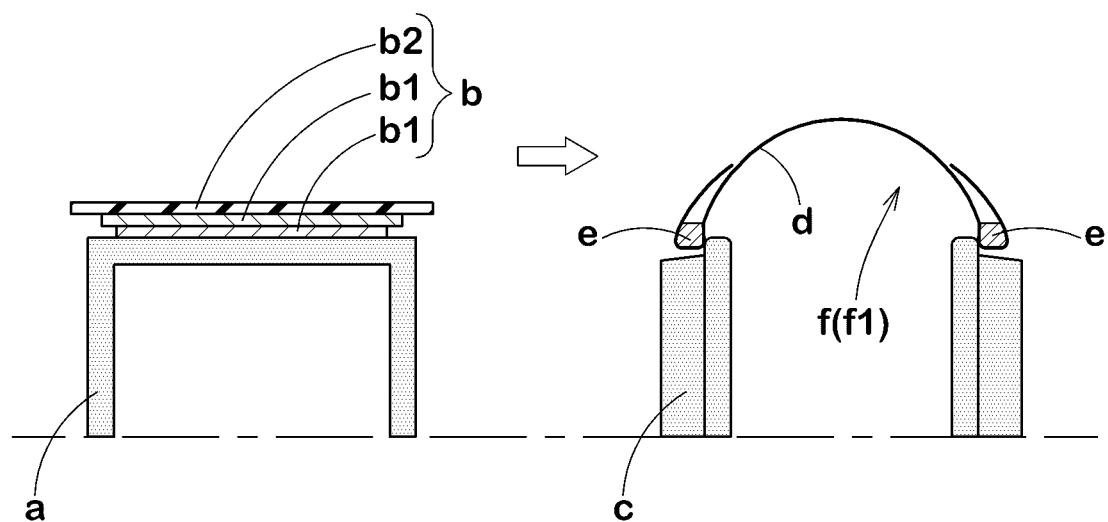
FIG. 8A is a conceptual diagram illustrating a conventional process of forming a belt structure.
Figure 8B:
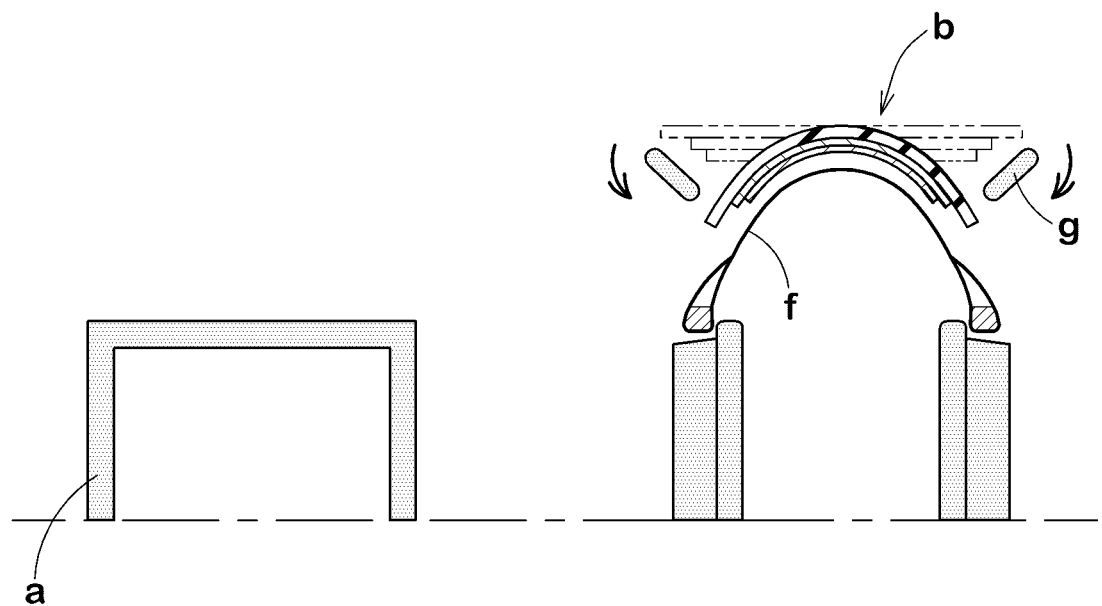
FIG. 8B is a conceptual diagram illustrating a conventional process of forming a belt structure.
Figure 9A:
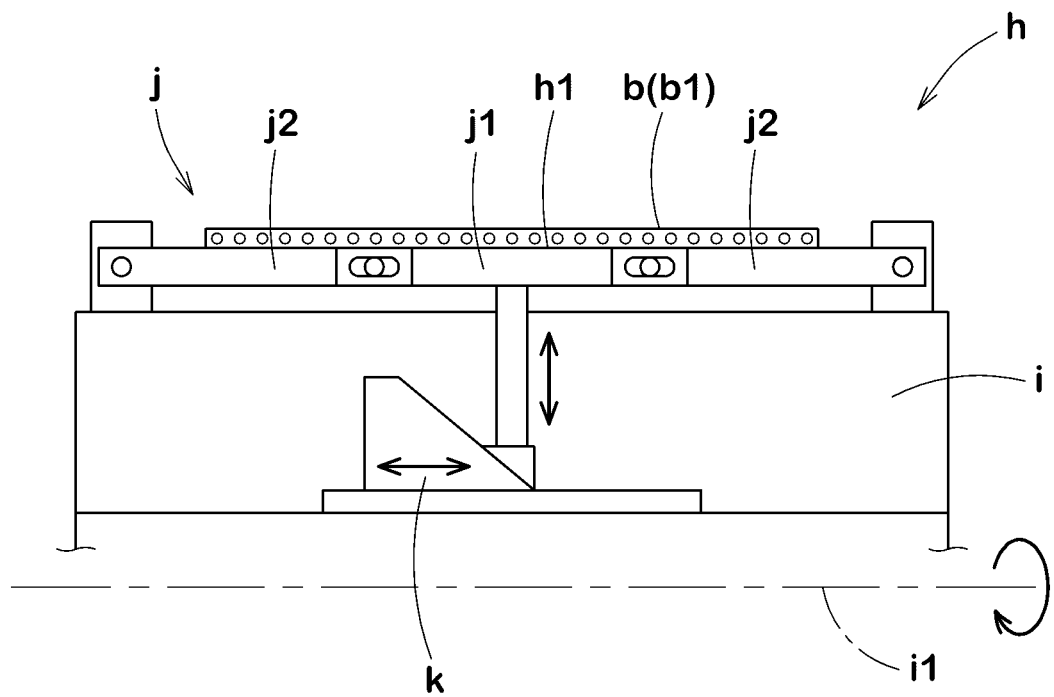
FIG. 9A is a conceptual diagram illustrating another conventional process of forming a belt structure.
Figure 9B:
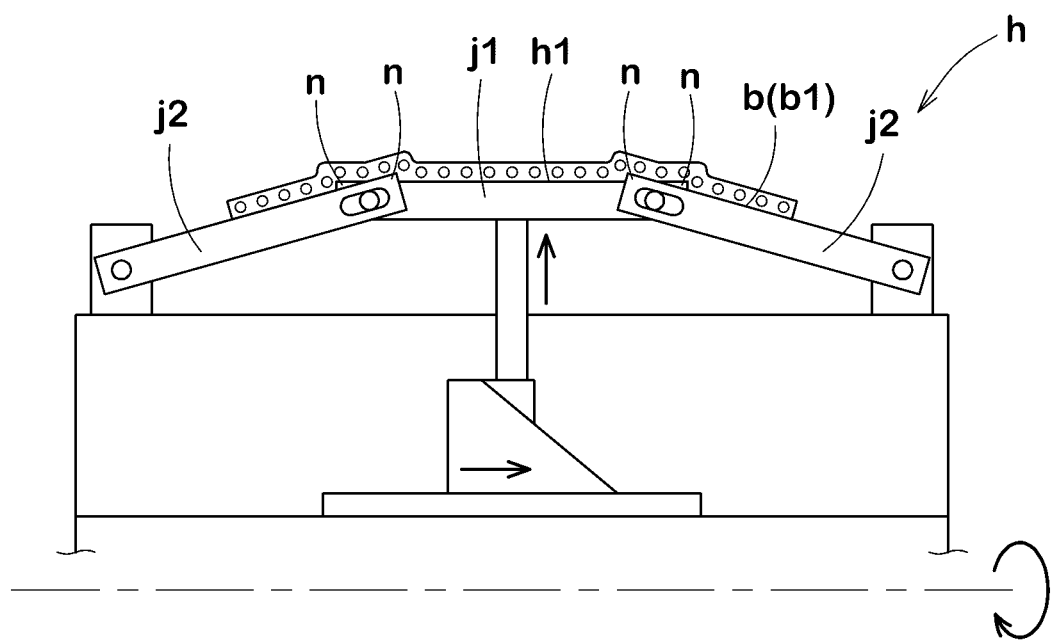
FIG. 9B is a conceptual diagram illustrating another conventional process of forming a belt structure.

Next, each of the belt support portions 3 is expanded in the drum radial direction by the expanding and contraction means 4. Specifically, as shown in FIG. 7A, the piston rod (21a) is extended outwardly in the drum radial direction, therefore, the inner end (5i) of the first link plate 5 and the inner end (6i) of the second link plate 6 are moved outwardly in the drum radial direction via the pin 7. Thereby, the first curved surface portion 17 of the first link plate 5 and the first curved surface portion 17 of the second link plate 6 become substantially continuous so as to form a continuous arc region 24 convex outwardly in the drum radial direction. The continuous arc region 24 configured as such can make the belt ply 37A into a toroidal shape convex outwardly in the drum radial direction, therefore, decrease of the outer diameter of the belt ply 37A in the stitch process is suppressed, thereby, it is possible that the undulating deformation is suppressed, for example. The term "substantially continuous" includes a case where a middle position (24c) in the drum axial direction of the continuous arc region 24 is formed in a smooth arc shape arranged outermost in the drum radial direction within the continuous arc region 24. Further, the term "substantially continuous" also includes a case where there is an area located outermost in the drum radial direction other than the middle position (24c) if in the continuous arc region 24, as shown in FIG. 7B. Specifically, it includes a case where a distance D2 in the drum radial direction between an outermost point (24b) in the drum radial direction of the continuous arc region 24 and the middle position (24c) is not more than 2 mm.

In order to effectively exert the effects described above, as shown in FIG. 7A, it is preferred that a width (wb) of the continuous arc region 24 is set to be in a range of from 30% to 85% of a width (w1) (shown in FIG. 6B) of the outer peripheral surface 11. If the width (wb) of the continuous arc region 24 is less than 30% of the width (w1) of the outer peripheral surface 11, it is possible that the belt ply 37A is not formed in a smooth circular arc shape. If the width (wb) of the continuous arc region 24 is more than 85% of the width (w1) of the outer peripheral surface 11, it is possible that the maximum concave amount D1 is more likely to be greater than 10 mm in the contracted state 51, therefore, it is possible that the belt ply 37A cannot be wound accurately. The width (wb) of the continuous arc region 24 is a length thereof in the drum axial direction.

It is preferred that a radius of curvature (R) (shown in FIG. 4B) of each of the first curved surface portions 17 of the first link plate 5 and the second link plate 6 are in a range of from 260 to 1200 mm. If the radius of curvature (R) is less than 260 mm, large stress is applied to the belt ply 37A especially when changing from the contracted state 51 to the expanded state 52, therefore, it is possible that the belt ply 37A is not formed in a smooth circular arc shape. If the radius of curvature (R) is more than 1200 mm, each of the first curved surface portions 17 has a shape close to a straight line, therefore, it is possible that the belt ply 37A cannot be formed in a smooth circular arc shape.

It is preferred that both edges of the belt ply 37A are kept held by the above-mentioned vacuum absorption device or the like when the belt support portions 3 are expanded.

Next, in the expanded state 52, the band ply 38A and the tread rubber 39 (not shown) are wound in turn around the outside in the drum radial direction of the belt ply 37A. Thereby, the belt structure 32 is formed. The band ply 38A and the tread rubber 39 may be sheet-like or may be formed by spirally winding a strip having a width in about a range of from 10 to 30 mm in the drum axial direction.

While detailed description has been made of an especially preferred embodiment of the present invention, the present invention can be embodied in various forms without being limited to the illustrated embodiment.

The invention claimed is:

1. A belt drum device for forming a belt structure including a belt to be used in a tread of a tire, the device comprising:
   a drum base rotatable around a drum rotational axis,
   a plurality of belt support portions arranged outside the drum base around the drum rotational axis in a drum circumferential direction, and
   a plurality of expansion and contraction means each for expanding and contracting corresponding one of the belt support portions in a drum radial direction, wherein
   each of the plurality of the belt support portions comprises
   a first link plate having an outer end being rotatably connected with a first end of the drum base and an inner end,
   a second link plate having an outer end being rotatably connected with a second end of the drum base and an inner end, and
   a pin connecting the inner ends of the first link plate and the second link plate with each other so as to be movable in the expanding and contracting direction, and
   each of the first link plate and the second link plate has an outer peripheral surface around which the belt is wound in the drum circumferential direction,
   wherein
   in a transverse cross-sectional view passing through the drum rotational axis of the first link plate and the second link plate in a contracted state,
   each of the outer peripheral surfaces comprises a flat surface portion extending straight on a side of the outer end in a drum axial direction and an arc-shaped curved surface portion connected with the flat surface portion and curved toward the drum rotational axis as it approaches the inner end, wherein
   the flat surface portion of the first link plate and the flat surface portion of the second link plate are held in parallel to the drum rotational axis and heights in the drum radial directions of the two flat surface portions are aligned, and
   a part of the curved surface portion of the first link plate and a part of the curved surface portion of the second link plate are connected with each other to form a curved surface portion comprising two arc-shaped portions sandwiching a concave portion concave toward the drum rotational axis, and in a transverse cross-sectional view passing through the drum rotational axis of the first link plate and the second link plate in an expanded state, the curved surface portion of the first link plate and the curved surface portion of the second link plate are substantially continuous so as to form a continuous arc region convex outwardly in the drum radial direction.

2. The belt drum device according to claim 1, wherein the continuous arc region in the expanded state has a width in a range from 30% to 85% of a width of the outer peripheral surface.

3. The belt drum device according to claim 1, wherein a radius of curvature of the curved surface portion is in a range from 260 to 1200 mm.

4. The belt drum device according to claim 1, wherein in the contracted state, a maximum concave amount of the curved surface portion with respect to the flat surface portion is not more than 10 mm.

5. The belt drum device according to claim 1, wherein
the outer ends of the first link plate and the second link plate are each provided with an elongated hole elongated in a longitudinal direction of the first link plate and the second link plate,
the first link plate and the second link plate are connected with the drum base by the pin positioned inside the elongated holes so as to penetrate both of the elongated holes so that the first link plate and the second link plate can also slide with respect to the drum base, and
the inner ends of the first link plate and the second link plate are connected with each other so as not to slide with respect to each other.

6. The belt drum device according to claim 1, wherein each of the outer peripheral surfaces is exposed such that a belt structure is wound directly on the outer peripheral surfaces.

7. The belt drum device according to claim 1, wherein in a direction of the drum rotational axis, a length of the concave portion is greater than a length of a portion in which the first link plate and the second link plate overlap with one another.

8. The belt drum device according to claim 1, wherein in a direction of the drum rotational axis, a length of the concave portion is greater than a length of a portion in which the first link plate and the second link plate overlap with one another so that the concave portion, in the expanded state, changes into a convex portion having a radius of curvature ranging from 260 to 1200 mm.

9. The belt drum device according to claim 1, wherein
the outer peripheral surface of each of the first link plate and the second link plate comprises a wide portion having a constant width in a drum circumferential direction and a narrow portion connected with the wide portion and having a width smaller than that of the wide portion, and
the narrow portion of the first link plate and the narrow portion of the second link plate are arranged to face each other so as to have a total width which is substantially same as a width of the wide portions of the first link plate and the second link plate.

* * * * *